United States Patent [19]
Schaar

[11] 3,951,637
[45] Apr. 20, 1976

[54] FORMING STATION FOR A MACHINE FOR FORMING HOLLOW ARTICLES OF VITREOUS MATERIAL

[75] Inventor: Lothar Schaar, Heuerssen, Germany

[73] Assignee: Hermann Heye, Obernkirchen, Germany

[22] Filed: May 14, 1974

[21] Appl. No.: 469,846

[30] Foreign Application Priority Data
May 15, 1973 Germany............................ 2324953

[52] U.S. Cl.................................. 65/229; 65/240; 65/264; 65/266; 65/359; 65/361
[51] Int. Cl.² ....................... C03B 9/00; C03B 9/14
[58] Field of Search ............ 65/361, 357, 360, 359, 65/229, 240, 264, 266

[56] References Cited
UNITED STATES PATENTS

| | | | |
|---|---|---|---|
| 636,590 | 11/1899 | Triance | 65/360 X |
| 854,236 | 5/1907 | Reichel | 65/360 X |
| 877,981 | 2/1908 | Beeson | 65/361 X |
| 1,406,722 | 2/1922 | Brown | 65/229 |
| 2,348,347 | 5/1944 | Koob | 65/359 X |
| 3,244,499 | 4/1966 | Wiley | 65/361 X |
| 3,834,884 | 9/1974 | Kurokawa et al. | 65/229 |

Primary Examiner—S. Leon Bashore
Assistant Examiner—Frank W. Miga
Attorney, Agent, or Firm—Michael J. Striker

[57] ABSTRACT

A machine for forming hollow articles of vitreous material includes at least one forming station provided with at least one forming means and for each forming means a neck ring means carrying a parison and including a pair of neck ring halves and a guide ring coaxially carried by the neck ring halves and rotatable relative thereto. The guide ring which engages the parison at its mouth is rotated to thereby impart to the parison a rotary motion relative to the remainder of its forming means which may comprise a split mold to thereby avoid formation of seams or fins on the finished hollow article and to improve the surface quality thereof.

17 Claims, 16 Drawing Figures

FORMING STATION FOR A MACHINE FOR FORMING HOLLOW ARTICLES OF VITREOUS MATERIAL

BACKGROUND OF THE INVENTION

The present invention relates to a forming station for the production of hollow articles of vitreous material which includes at least one forming means i.e., a forming tool or a mold, and for each forming means a neck ring means carrying a parison and including a pair of neck ring halves and an integral guide ring coaxially carried by the neck ring halves and rotatable relative thereto so that relative rotary movement is imparted to the parison carried by the neck ring relative to the remainder of its forming means.

In a known forming station of the aforementioned kind (German Offenlegungsschrift No. 2,243,429) an integral guide ring is connected by pin-and-slot connections with a three-part neck ring for rotation with the same. Each neck ring part is rotated by means of an annular gear coaxially mounted with the neck ring and connected thereto for rotation therewith. The teeth of the annular gear mesh with the teeth of a gear which is mounted at the forming station turnable about its axis and a sprocket gear is coaxially mounted with the last-mentioned gear and connected thereto for rotation about a common axis. The chain gear is engaged with a sprocket chain which is driven by an additional sprocket gear. Upon rotation of the last-mentioned sprocket gear the neck ring and the guide ring therein will therefore be rotated relative to the remaining forming tool, for instance a mold coaxially mounted with the neck ring.

This known arrangement has the disadvantage that it comprises a relatively large number of complicated and expensive components. This leads to trouble during the rough operating conditions such forming stations are subjected to and this also makes proper maintenance and repair of the forming station rather difficult. Since during use of a plurality of forming stations the aforementioned sprocket gears are in mesh with the sprocket chain, all neck rings will be rotated simultaneously. A selective rotation of only one neck ring is not possible. Furthermore, only a single forming tool can be provided at each of the above-described forming stations. Since the neck ring is turned synchronously with the guide ring coaxially mounted therein, a desirable positive clamping of the neck ring on the remaining forming tool, for instance a mold, is not possible. To the contrary, a more or less wide gap has to be maintained between the mold and the neck ring which leads to undesirable fins or seams on the finished hollow glass article and also necessarily to a limiting of the pressure of the blowing medium.

SUMMARY OF THE INVENTION

It is an object of the present invention to provide one or a plurality of forming stations of the aforementioned kind with simple means which will accomplish movement of the parison relative to a maximum portion of its forming tool.

It is a further object of the present invention to provide for such an arrangement, regardless whether a single or plurality of forming tools are provided at each forming station.

With these and other objects in view, which will become apparent as the description proceeds, the forming station in a machine for forming hollow articles of vitreous material mainly comprises at least one forming means, a neck ring means for each forming means and including a pair of neck ring halves and an integral guide ring coaxially carried by said neck ring halves rotatable relative thereto and adapted to carry a parison, and means for rotating the guide ring relative to the neck ring halves to thereby impart a rotary motion to the parison relative to the remainder of its forming means.

In other words, in this construction a rotary motion is imparted to the parison relative to the remainder of its forming means including the neck ring halves only be rotating the integral guide ring coaxially carried by the neck ring halves. Since only the guide ring has to be rotated, the construction is considerably simpler than the above-described construction of the prior art and at the same time the necessary space for the construction is also reduced. The mouth of the parison can remain, until release of the finished hollow article, in the closed neck ring means despite the relative movement of the guide ring and the parison carried thereby relative to the remainder of the forming means. The mouth of the finished article can thus be formed with the necessary close tolerances required for modern closures and closing machines for such hollow glass articles. The mouth portion can therefore remain on the finished hollow glass article or as so-called "lost mouth portion" later be separated from the finished hollow glass article with a relatively small loss of glass. Since according to the invention only the guide ring has to be rotated, the neck ring halves can be positively or non-positively connected to corresponding portions of the forming means, for instance a finish form or blow mold. In this way an exact centering and a gap-free seal between the neck ring halves and the remainder of the forming means may be obtained. This, in turn, permits the use of relatively large blowing pressure at a blowing station, which increases the quality of the finished hollow glass article considerably.

According to a further feature of the present invention, the forming station may be arranged movable along a predetermined path, and the rotating means for rotating the guide ring may comprise stationary means extending along the aforementioned path and means on the guide ring engaging the stationary means for rotating the guide ring during movement of the forming station along the path. The aforementioned stationary means may comprise a rack extending along the path and the means on the guide ring may comprise a gear coaxially fixed to the guide ring and meshing with the rack.

The forming station may be movable along a predetermined path having a circular portion and in this case the rotating means may comprise a gear ring concentrically arranged to the circular portion of the path, a gear coaxially fixed to the guide ring and meshing with the gear ring, and means for selectively rotating the gear ring about its axis. This arrangement has the advantage that the drive of the guide ring may be made independent from the movement of the forming station along its path. Thus, for instance, the guide ring may be driven faster or slower in relation to the speed of movement of the forming station along its path or the guide ring may also be alternatingly driven in opposite directions.

When the forming station is stationary, the rotating means may comprise a gear coaxially fixed to the guide ring, a pinion meshing with the gear, and a drive for selectively rotating the pinion. On the other hand, the rotating means may comprise a crank drive connected to the guide ring for imparting to the latter an oscillating rotary motion. Such an oscillating rotary motion can be of advantage if a rotation of the guide ring in only one direction is not desired.

The forming station may also include blowing means having a blowing head coaxially arranged with the guide ring, and in this case means may be provided for rotating the blowing head about its axis and means for selectively coupling the blowing head to the guide ring for rotating the latter together with the blowing head. Such an arrangement is of importance during all forming steps in which blowing means are used, for instance, during intermediate or during finish blowing of the hollow article. During the finish blowing the neck ring may be clamped on the blow mold so that these two elements are properly centered with respect to each other. On the other hand, the neck ring may simply loosely engage a corresponding portion of the blow mold or even be arranged at a small distance from the latter. Preferably, however, the gap in the latter case between the neck ring and the blow mold is held very small so that during the blowing only a small portion of the mass of the parison will be driven in the aforementioned gap. The coupling between the blowing head and the guide ring can, for instance, be accomplished by keeper pins. In each case it is advantageous if the blowing head engages only the guide ring and that this engagement is substantially gas-tight so that a small as possible amount of the blowing medium may escape between the blowing head and the guide ring.

The aforementioned blowing means may comprise a drive sleeve and means for rotating the drive sleeve about its axis. In this case the blowing head may be arranged coaxially with and axially movable with respect to the drive sleeve and connected to the latter for rotation therewith, whereas the drive sleeve is preferably held immovably in axial direction to simplify the drive of the same.

The forming station may also include a blowing head coaxially arranged with the guide ring on the blowing station and connected thereto for rotation therewith, and in this case the blowing head is rotated about its axis to thereby rotate also the guide ring.

A plurality of such forming stations with blowing heads may be provided in a machine and in this case each of the blowing heads may comprise a drive sleeve connected to the blowing head for rotation therewith and the drive sleeves of the plurality of blowing heads may be constructed to be in drive engagement with each other, so that the rotating means may engage only one of the drive sleeves for rotating the same about its axis to thereby rotate all the blowing heads and the guide rings connected thereto.

The guide ring is preferably provided on the surface thereof engaging the parison with profiled surface portions to assure rotational movement of the parison together with the guide ring. The forming means may comprise a mold for forming the parison carried by the guide ring to its final form, or the forming means may comprise means for preforming, for instance intermediately forming, a parison carried by the guide ring. Such preforming means may comprise a support plate arranged coaxially with and spaced downwardly from the neck ring means for engaging a bottom part of a parison carried by the neck ring means, or a tool which can be brought in engagement with a wall portion of the parison to preform the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1A:
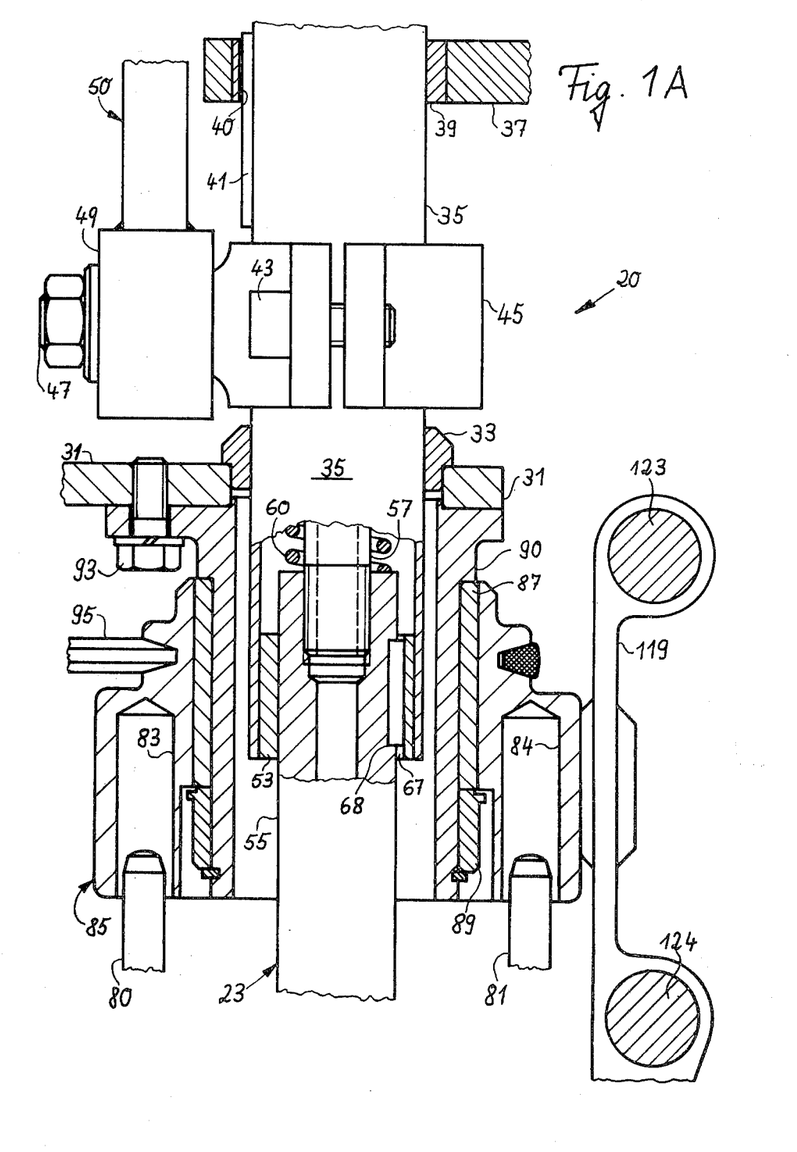
FIGS. 1A and 1B are partial longitudinal sections through a forming station with a blow mold and a blowing device.
Figures 1B, 2:
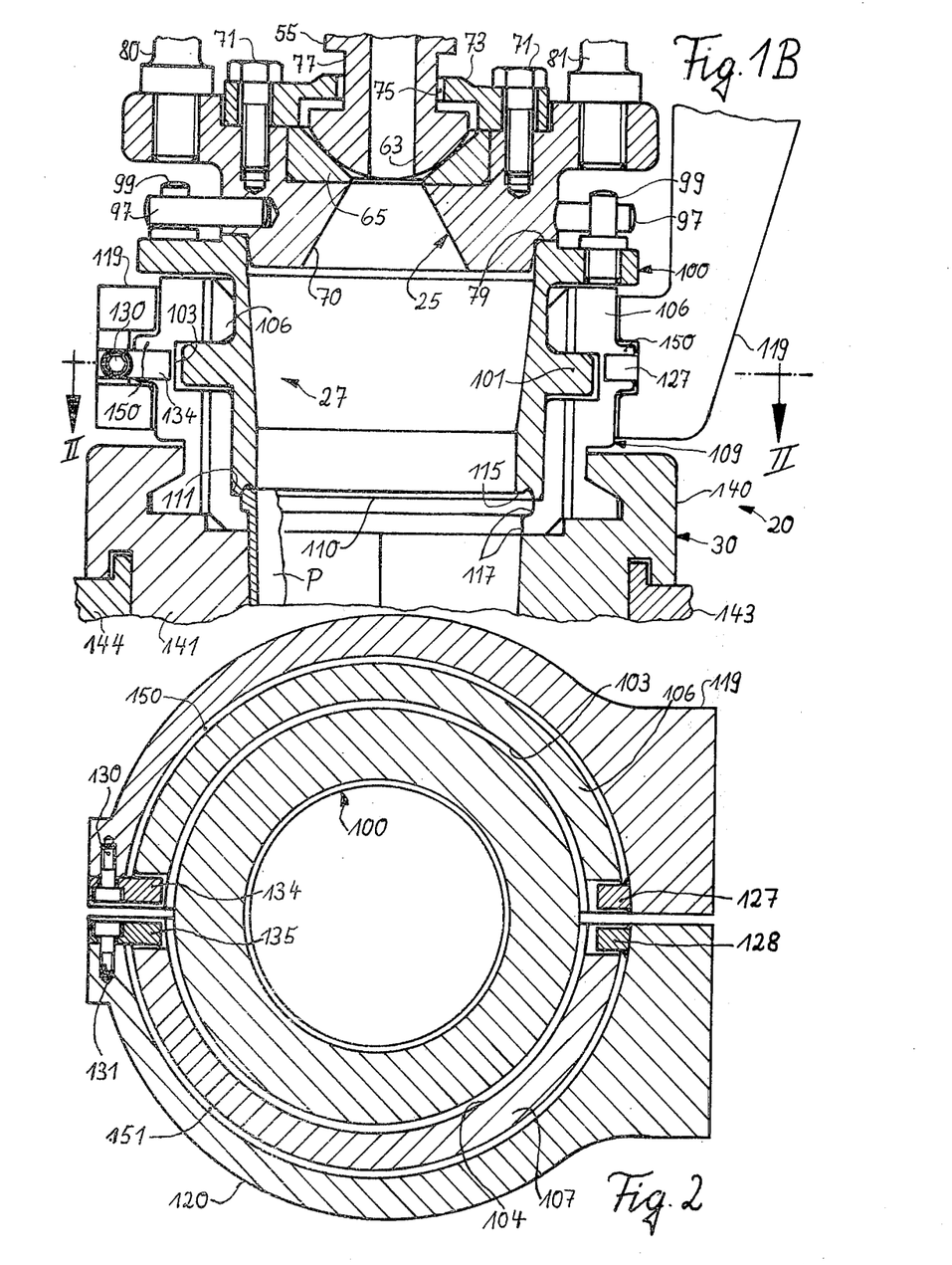
FIG. 2 is a cross section taken along a line II—II of FIG. 1B.

FIGS. 1A and 1B schematically illustrate a forming station 20 which may be arranged stationarily or movably along a predetermined path, for instance along a circular path about the axis of a turntable. The forming station 20 comprises blowing means 23 with a blowing head 25, neck ring means 27 (FIG. 1B) and a divided finish or blow mold 30.

A conduit 35 of the blowing means 23 is axially movable mounted in a slide bearing 33 which, in turn, is mounted in a mounting plate 31 which may be arranged stationarily or which may form part of a rotating turntable. A second slide bearing 39 which is mounted on a second mounting plate 37, which may also be arranged stationary or turnably with the mounting plate 31 about a common axis, provides a second bearing for the conduit 35. An axially extending groove 40 in the slide bearing 39 and a key 41 connected to the conduit 35 prevents absolute turning of the conduit about its longitudinal axis. A split clamping ring 45 is clamped by means of a screw 43 onto the conduit 35 and this clamping ring is provided with a laterally projecting trunnion 47 on which an eye 49 of a connecting rod 50 of a non-illustrated crank drive is turnably mounted. The crank drive is operated in a known manner during the operating cycle of the machine in such a manner so as to impart to the conduit 35 at a predetermined moment an oscillating vertical movement. The crank drive and the likewise not illustrated drive motor therefor may, for instance, be mounted on the mounting plate 31.

A slide bearing 53 is mounted within the lower end of the conduit 35 and this bearing guides a connecting conduit 55 of the blowing means 23 in axial direction. A pressure gas supply conduit 57 is gas-tightly screwed into the upper end of the connecting conduit 55 through which a blowing medium, for instance air under pressure, is supplied to the connecting conduit 55 and therewith to the blowing head 25 connected to the lower end of the connecting conduit 55. The unit comprising the blowing head 25, the connecting conduit 55 and the supply conduit 57 is prevented by non-illustrated means of known construction to drop out of the conduit 35 and is during axial relative movement of the latter biased by a spring 60 in downward direction relative to the conduit 35. The conduit 35 and the blowing head 25 are therefore non positively, i.e., not positively, connected with each other.

The lower end of the connecting conduit 55 is formed as a semispherical part 63, which may for instance be of steel, which is in engagement with an annular seat 65, which may be formed from bronze. The connecting conduit 55 is prevented from turning with respect to the conduit 35 by a longitudinal groove 67 formed in the slide bearing 53 and a key 68 connected to the connecting conduit.

The blowing head 25 is provided with a fitting member 70 in which the annular seat 65 is mounted and connected thereto in any convenient manner. A cover 73 is connected by screws 71 to the upper surface of the fitting member 70. The cover 73 is provided with a slot 75 through which a portion 77 of reduced diameter of the connecting conduit 55 extends so that the cover 73 is spaced with ample clearance from the connecting conduit 55 and the semispherical end part 63 thereof, as clearly shown in FIG. 1B. The cover 73 prevents in this way an undesired separation of the connecting conduit 55 from the blowing head 25, while permitting a certain angular adjustment between the longitudinal axes of the connecting conduit 55 and the blowing head 25. Such an angle between the aforementioned axes may occur when the upper contact face 79 of the neck ring means 27 would not be located in a horizontal plane. In this way, the fitting member 70 may adjust itself to the position of the neck ring means 27 so that at the surface 79 a sufficient seal for the blowing medium will be obtained.

Two bolts 80 and 81 are screwed with the lower ends thereof diametrically opposite each other into an upper portion of the fitting member 70 and these bolts project in axial direction upwardly from the fitting member 70 into corresponding bores 83 and 84 of a drive sleeve 85 to be axially movable in these bores. The drive sleeve 85 is, by means of a slide bearing 87, which may for instance be formed of bronze, turnably mounted on a sleeve 90 which is connected by screws 93, only one of which is shown in FIG. 1A, to the bottom face of the mounting plate 31, and the drive sleeve 85 is secured against axial movement by a ring 89. The drive sleeve 85 is driven by a non-illustrated motor which may be mounted on the mounting plate 31 by means of V-belt 95, or oscillated about its axis. Such turning movement of the drive sleeve 85 is transmitted through the bolts 80 and 81 to the blowing head 25.

A plurality of substantially radially extending pins 97 are press-fitted in corresponding bores provided in a lower portion of the fitting member 70 and these pins cooperate with pins 99 normally arranged thereto and connected to and projecting upwardly from an integral guide ring 100 of the neck ring means 27 which further comprises two neck ring halves 106 and 107 rotatably carrying the guide ring. If the blowing head 25 is oscillated about its axis, then either the pins 97 or the pins 99 have to be fork-shaped with relatively small radial play therebetween. The guide ring 100 is provided at its upper end with the already-mentioned contact surface 79 engaging a corresponding surface of the fitting member 70 and between the upper and the lower end thereof the guide ring 100 is provided with an annular radially outwardly extending flange 101 which engages in corresponding grooves 103 and 104 of the two halves 106 and 107 of a neck ring 109 of the neck ring means 27. The lower end of the guide ring 100 abuts with an annular portion against a shoulder 111 of the neck ring halves 106 and 107, forming a small gap 110 with the corresponding upper surfaces of the neck ring halves. The upper face of the annular flange 101 is in engagement with the corresponding upper faces formed by the grooves 103 and 104 of the neck ring halves, in order to obtain as small a gap 110 as possible.

The guide ring 100 is therefore with a lower annular surface 115 in contact with the mouth of a parison P partly shown in FIG. 1B and in a similar manner the neck ring halves 106 and 107 are along an annular surface 117 in contact with the mouth of the parison.

Each half 106, 107 of the neck ring means 27 is suspended in holding elements 119 and 120 which are mounted movable relative to each other on two rods 123 and 124. Such movement of the holding elements 119 and 120 is performed in a known manner when the neck ring means are to be opened or closed. The rods 123 and 124 form part of a non-illustrated device which carries the neck ring means or which transports the same aligned in axial direction with the blowing head 25 and the blow mold 30.

The position of the neck ring halves 106, 107 relative to the holding elements 119, 120 is fixed by means detents 127, 128 (FIG. 2) welded to the holding elements 119 and 120 and further detents 134, 135 respectively connected to the holding elements 119, 120 by screws 130 and 131.

The closed neck ring halves 106, 107 are encompassed as shown in FIG. 1B, at the lower ends thereof by the halves 140, 141 of a blow mold 30, which halves are suspended in tongs 143 and 144 of known construction and only partially illustrated in FIG. 1B. The movement of the tongs for opening and closing the blow mold is controlled in known manner during the operating cycle of the machine. The blow mold halves 140 and 141 and its tong parts 143 and 144 can also be arranged in a position turned through an angle of 90° about their longitudinal axis from the position as shown in FIG. 1B.

FIG. 2 illustrates also that the neck ring halves 106, 107 are respectively suspended with semicircular outer flanges 150, 151 in the holding elements 119, 120.

Figure 3:
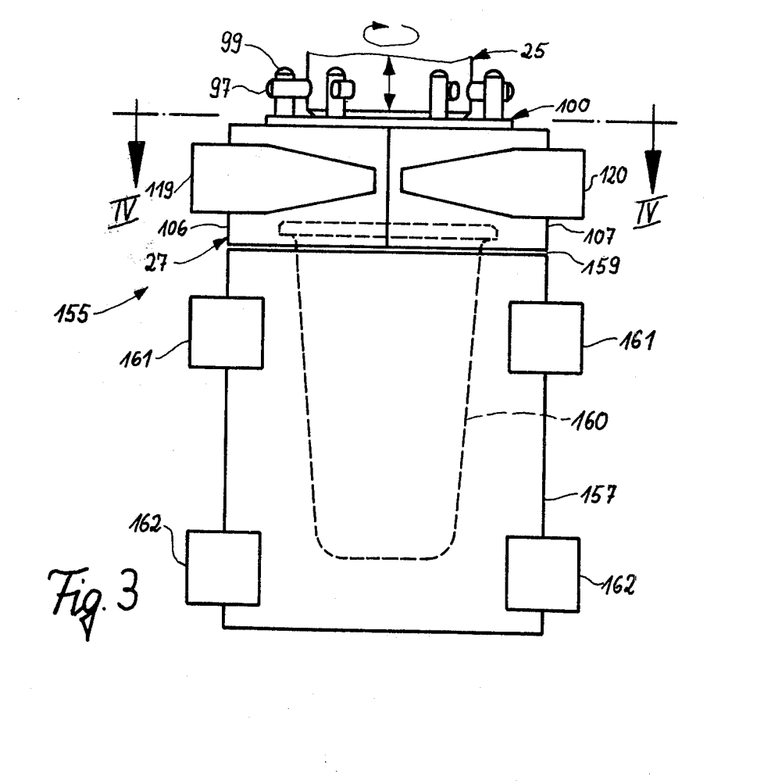
FIG. 3 is a side view of another forming station with an integral finish mold.
Figure 4:
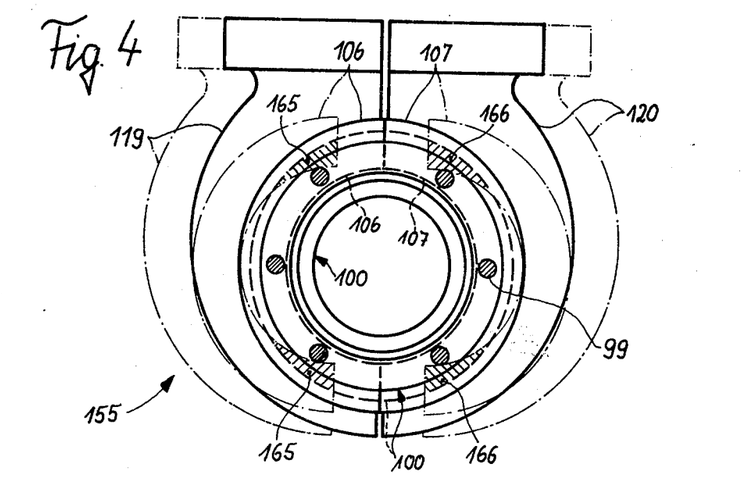
FIG. 4 is a cross section taken along the line IV—IV of FIG. 3.

Another forming station 155 is illustrated in FIGS. 3 and 4, and parts shown in these figures which correspond to the parts described above in connection with FIGS. 1A, 1B and 2, are provided with the same reference numerals. In the construction illustrated in FIGS. 3 and 4 there exists a small gap 159 between the neck ring means 27 and the undivided blow mold 157. This gap 159 can be very small and even zero when, as preferred, during the blowing operation the neck ring means 27 and the blow mold 157 are at adjacent faces thereof in engagement with each other.

A finished hollow glass article 160 is illustrated in dotted lines in FIG. 3. In order to remove the article 160 from the mold 157, the latter may be moved sufficiently in downward direction, or, the blowing head 25 and the neck ring means 27 with the article 160 attached thereto may be lifted upwardly out of the mold and then be moved laterally. The mold 157 is suspended in mounting elements 161, 162.

The holding elements 119, 120 with the neck ring halves 106, 107 suspended therein are shown in full lines in their closed position in FIG. 4 and in dash-dotted lines in their open position. As can be visualized from this illustration, the guide ring 100 will also be carried in the open position of the necking halves 106, 107 in the regions 165, 166, of its flange 101 which for clarity are hatched in FIG. 4, so that the guide ring cannot fall out from the neck ring means 27.

Figure 5:
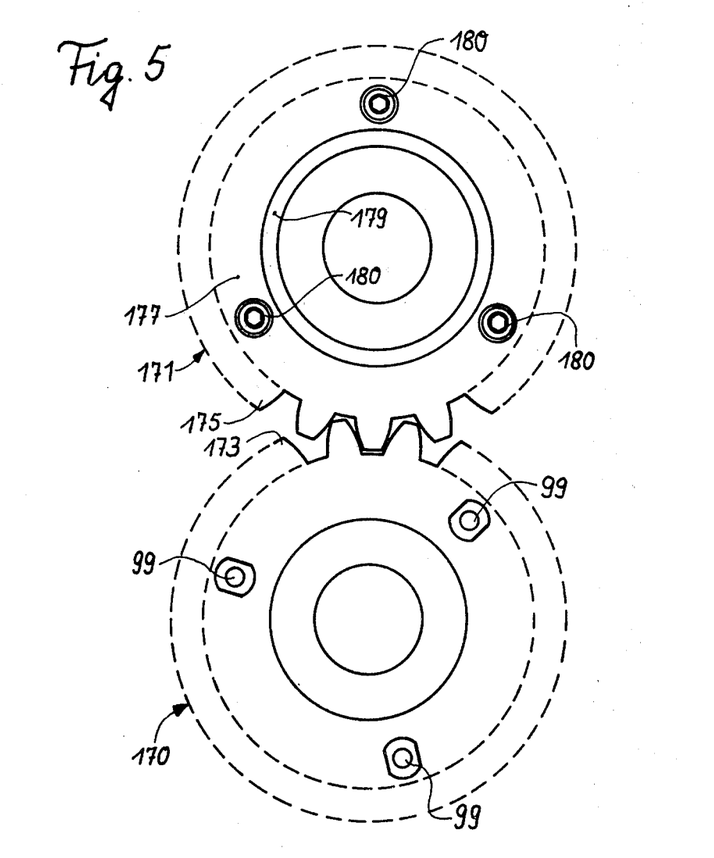
FIG. 5 is a top view of two guide rings connected by gear rings with each other of a double mold.

FIG. 5 is a schematic top view of two guide rings 170, 171 of a double mold. The guide ring 170 may be driven in the aforementioned described manner over the pins 99 by a blowing head 25, not shown in FIG. 5. The guide ring 170 is provided at an upper annular flange with an annular gearing 173 with which the teeth 175 of an annular gear 177 fixed to the other guide ring 171 mesh. The gear ring 177 is centered by means of a collar 179 with respect to the guide ring 171 and is releasably connected to the latter by means of screws 180.

The guide ring 171 is therefore indirectly driven by the guide ring 170 so that the blowing means for the guide ring 171 may be constructed without rotating means in a relatively simple manner.

Figure 6:
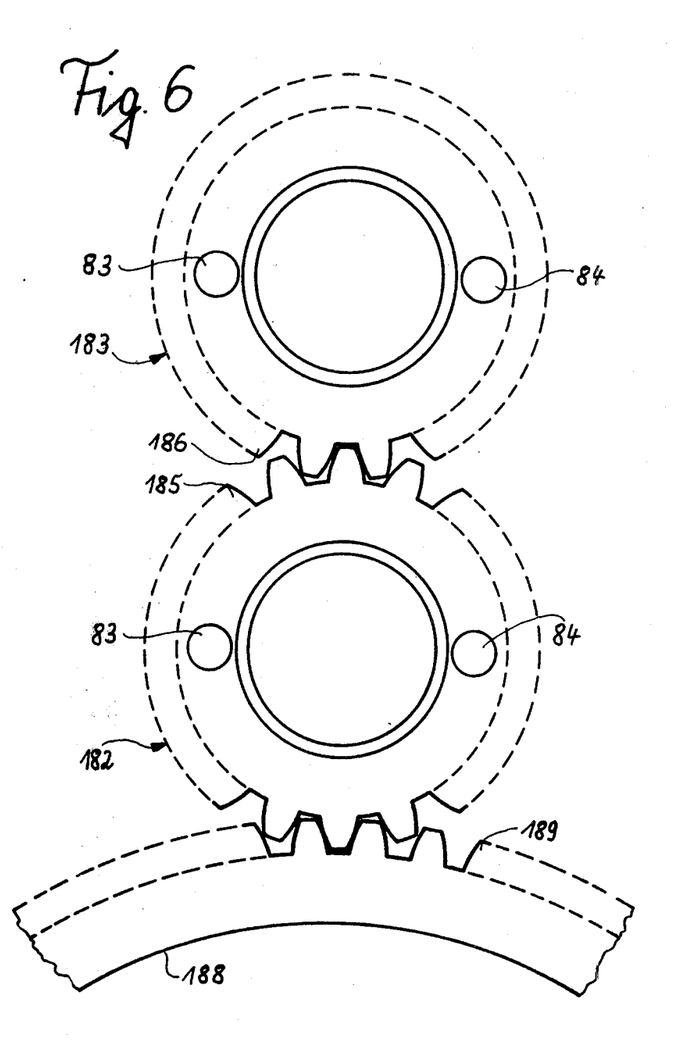
FIG. 6 is a bottom view of two blowing heads connected by gear rings of a double mold.

FIG. 6 illustrates a modified arrangement in a bottom view in which two drive sleeves 182, 183 are provided which respectively have radially outwardly projecting gear teeth 185, 186 in meshing engagement with each other. Each of the drive sleeves 182, 183 drives, in a manner as described in connection with FIGS. 1A and 1B, over the bores 83 and 84 formed therein the associated blowing head and the associated guide ring, not shown in FIG. 6. The drive sleeve 183 is indirectly driven through the drive sleeve 182 and the latter is driven from a rack 188, the teeth 189 of which are in meshing engagement with the teeth 185 of the drive sleeve 182. The drive sleeve 182 and the rack 188 may be moved in any desired manner relative to each other to thereby impart a desired rotation to the drive sleeves 182, 183 about their axes.

Figure 7:
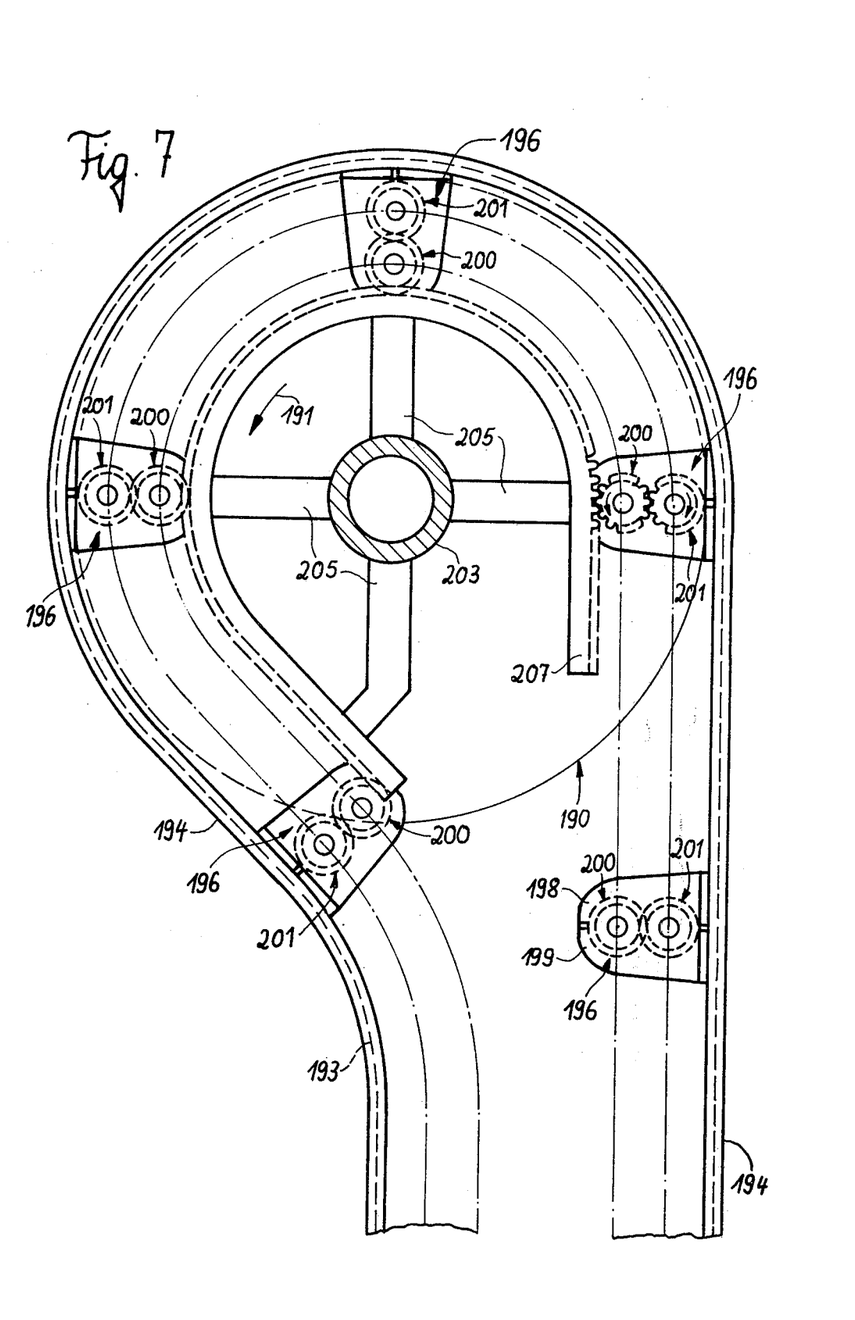
FIG. 7 is a partial, partially sectioned top view of a turntable of a machine for forming hollow glass articles with a plurality of double molds and a stationary rack for rotating the guide rings of the molds during movement thereof along a predetermined path.

How such a relative movement can be accomplished is, by way of example, schematically illustrated in FIG. 7. This Figure schematically illustrates a turntable 190 of a known press-and-blow machine, as for instance disclosed in U.S. Pat. No. 3,622,305. The turntable 190 is provided with four circumferentially equally spaced below blow molds, not shown in FIG. 7, which by means of the turntable are continuously moved in the direction of the arrow 191. A transporting chain 193 of known construction extends over part of the circumference of the turntable 190 and is guided in guide rails 194. This chain carries only the neck ring pairs 196, suspended in holding elements 198, 199, which in the same manner as the holding elements 119, 120 described above, are mounted and actuated. Carriages, not illustrated in FIG. 7, and forming part of the transporting chain 193 carry the holding elements 198, 199 and are guided in the guide rails 194.

Each neck ring pair 196 is provided with two guide rings 200, 201 which, in a manner as illustrated in FIG. 5, are connected by gear means for simultaneous rotation about their axes.

A partially circular bent rack 207 is connected by means of a plurality of struts 205 to a nonrotating part 203 of a central column of the turntable 190. The teeth of the rack 207 are located at the same elevation as the teeth on the guide rings 200, 201. Therefore, when a neck ring pair 196 moves into the region of the rack 207, the teeth on the guide ring 200 will meshingly engage the teeth of the rack 207 to thereby rotate the guide ring 200 and at the same time the guide ring 201 in the opposite direction. Such rotation will continue until the respective neck ring pair 196 leaves during its movement thereof with the chain 193, the rack 207.

Instead of driving the guide ring 200 directly in the aforementioned manner, it would also be possible that the rack 207, in a manner similar as shown by the rack 188 in FIG. 6, would drive indirectly the guide rings over drive sleeves and blowing heads.

Figure 8:
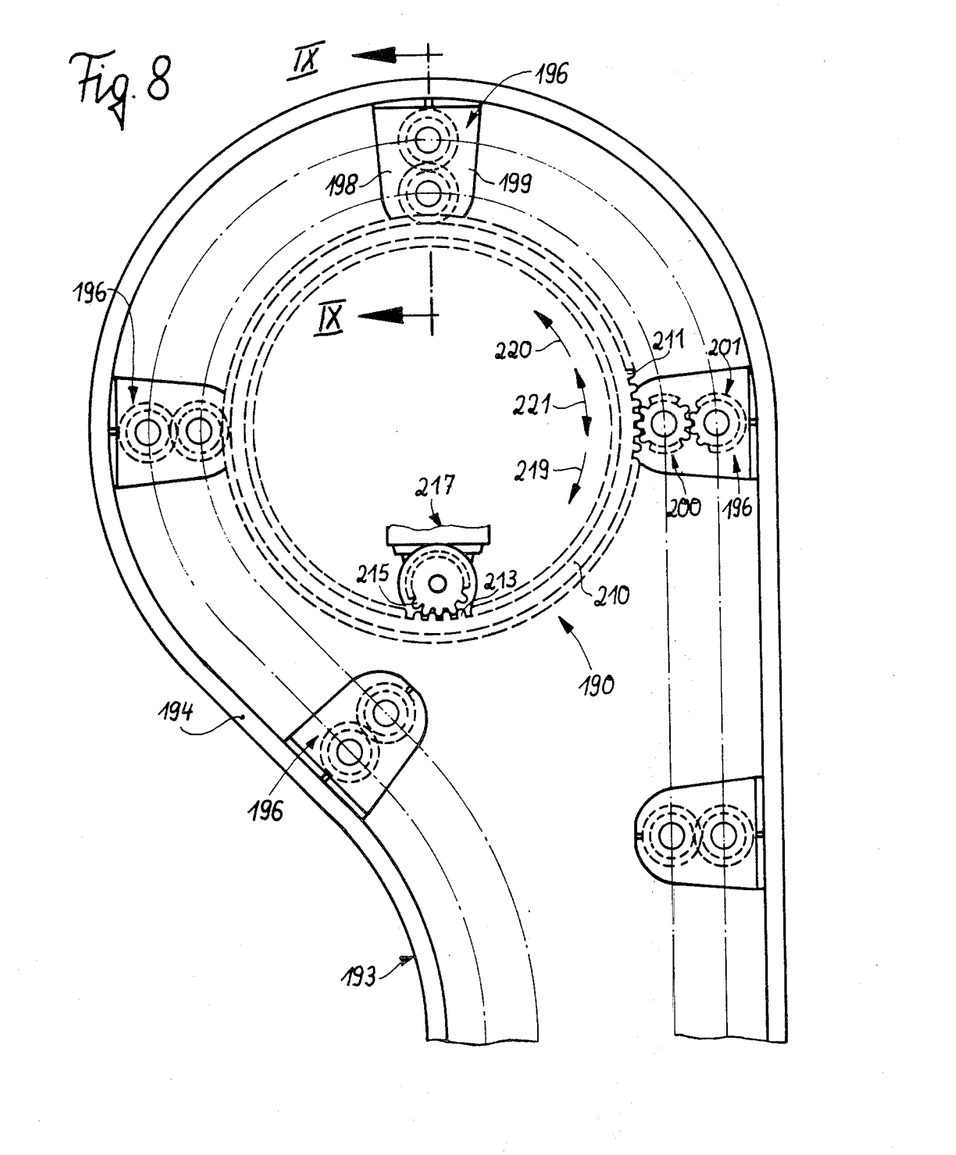
FIG. 8 is a partial top view of a similar arrangement in which the guide rings of the double molds are driven through a rotatable annular gear concentric with the turntable.

In FIG. 8 are such parts which are identical with parts shown in FIG. 7 provided with the same reference nu-numeral. Instead of the rack 207 shown in FIG. 7, the arrangement shown in FIG. 8 is provided with an annular gear 210 which is coaxially and turnably mounted on the turntable 190 and which is provided on its outer periphery with gear teeth 211 and at its inner periphery with gear teeth 213. The outer teeth 211 mesh with the teeth on the guide rings 200 on those neck ring means 196 which are in the region of the turntable 190. The inner teeth 213 mesh with the teeth of a pinion 215 driven by drive means 217, only partially shown in FIG. 8, and preferably mounted on the stationary support, not shown in the drawing, for the turntable 190. The drive means 217 are constructed to impart to the gear ring 210 selectively a rotation in the direction of the arrow 219 or of the arrow 220 or an oscillating turning movement in the direction of the double arrow 221.

Figure 9:
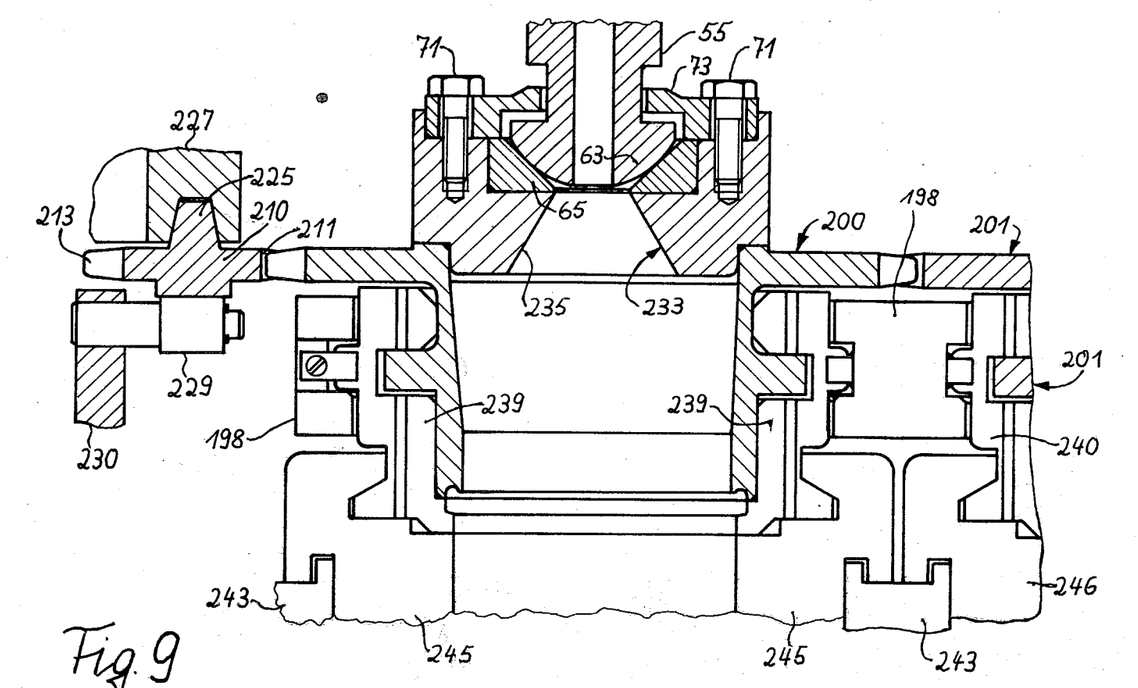
FIG. 9 is a schematic cross section taken along the line IX—IX of FIG. 8.

FIG. 9 illustrates how the annular gear 210 is guided by means of an upwardly projecting annular flange 225 integral therewith in a groove of a stationary bearing ring 227 arranged concentrically with the turntable 190 and how the annular gear 210 is supported on its lower side by a plurality of supporting rollers 229 which are circumferentially spaced from each other and turnably mounted on a stationary frame 230.

Respectively cooperating with the guide rings 200, 201 are blowing heads 233, of which only the blowing head for the guide ring 200 is shown in FIG. 9. The blowing heads are connected to the turntable 190 for rotation therewith about the axis of the latter and are therefore not directly driven and may be constructed in a simpler manner than the blowing head 25. A fitting member 235 of each blowing head 233 will, after contacting the respective guide ring 200 or 201, be taken along by friction so that a relative turning movement between the annular seat 65 and the semispherical end part 63 of the respective connecting conduit 55 will result.

Of the double mold only the holding element 198 with the neck ring halves 239 and 240 as well as one half of the tong 243 with the blow mold halves 245 and 246 suspended therein, are illustrated in FIG. 9. It is to be understood that the tongs, of which only the half 243 is illustrated in FIG. 9 as well as the blow molds of which the halves 245 and 246 are partially shown in this Figure are connected to the turntable 190 to move with the latter about the axis of the same and that the mold halves are only temporarily coupled with the respective neck ring pairs 196.

Figure 10:
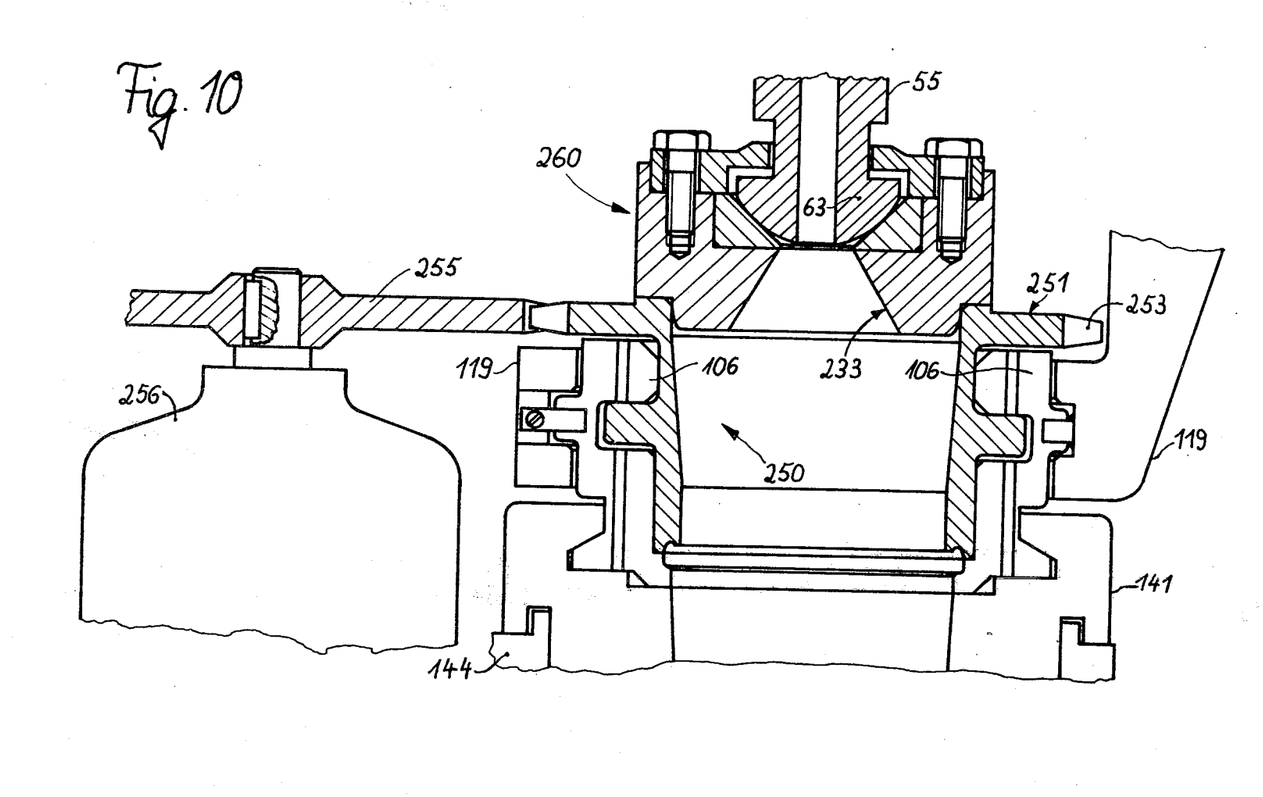
FIG. 10 is a partial longitudinal cross section through a forming station with a directly driven guide ring.

Parts shown in FIG. 10 which are identical with parts in the preceding Figures are designated with the same reference numerals. The neck ring means 250 shown in FIG. 10 is provided with a guide ring 251 which in the region of its upper end and at its outer surface is provided with an annular gear 253 integral therewith, the teeth of which mesh with the teeth of a pinion 255 driven by a motor 256. The motor 256 may be operated selectively to impart to the guide ring 251 a turning movement corresponding to the arrows 219–221 as shown in FIG. 8. The thus constructed forming station 260 may be stationarily arranged or be arranged movably along a predetermined path.

Figure 11:
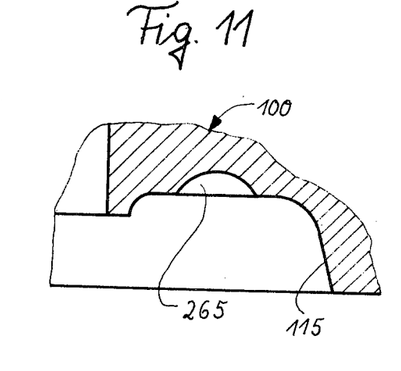
FIGS. 11 and 12 are respectively partial cross section through guide rings and illustrating profiling of a surface thereof adapted to engage the parison to assure rotation of the parison with the guide ring.

FIG. 11 partially illustrates the annular surface 115 of a guide ring 100 which is adapted to be in contact with the mouth end of a parison, not shown in FIG. 11. As shown in FIG. 11 this surface 115 is provided at its horizontally extending portion thereof with profiled surface portions to assure rotational movement of the parison together with the guide ring. Such profiled surface portions are shown in FIG. 11 as concave partspherical cavities 265, only one of which is illustrated in FIG. 11, but it is to be understood that a plurality of such concave cavities are provided circumferentially spaced from each other on the annular surface 115.

Figure 12:
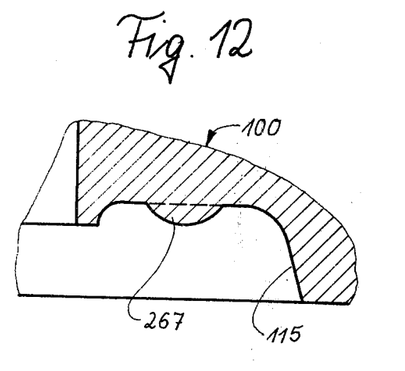

A modification of this construction is shown in FIG. 12 in which, instead of part-spherical cavities, a plurality of convexly curved part-spherical projections 267 are provided on the surface 115 and in which also only one of these projections is shown.

Figure 13:
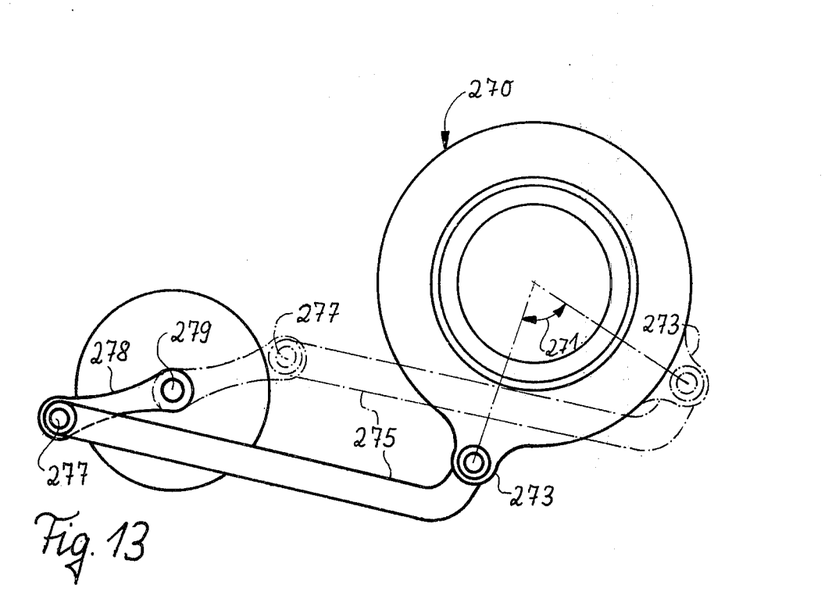
FIG. 13 is a schematic illustration of a crank drive for imparting an oscillating rotatary motion to a guide ring.

FIG. 13 schematically illustrates another construction for imparting to a guide ring 270 an oscillating turning movement through an angle 271. In the construction shown in FIG. 13 the guide ring 270 is provided on its outer peripheral surface with an eye 273 in which one end of a connecting rod 275 is turnably mounted. The other end of the connecting rod is turnably mounted on a trunnion 277 projecting upwardly from one end of a crank 278, the other end of which is fixed to a shaft 279 rotated about its axis to thereby move the connecting rod 275 between the two positions respectively shown in full lines and dash-dotted lines in FIG. 13 and to oscillate thereby the guide ring 270 through the angle 271.

Figure 14:
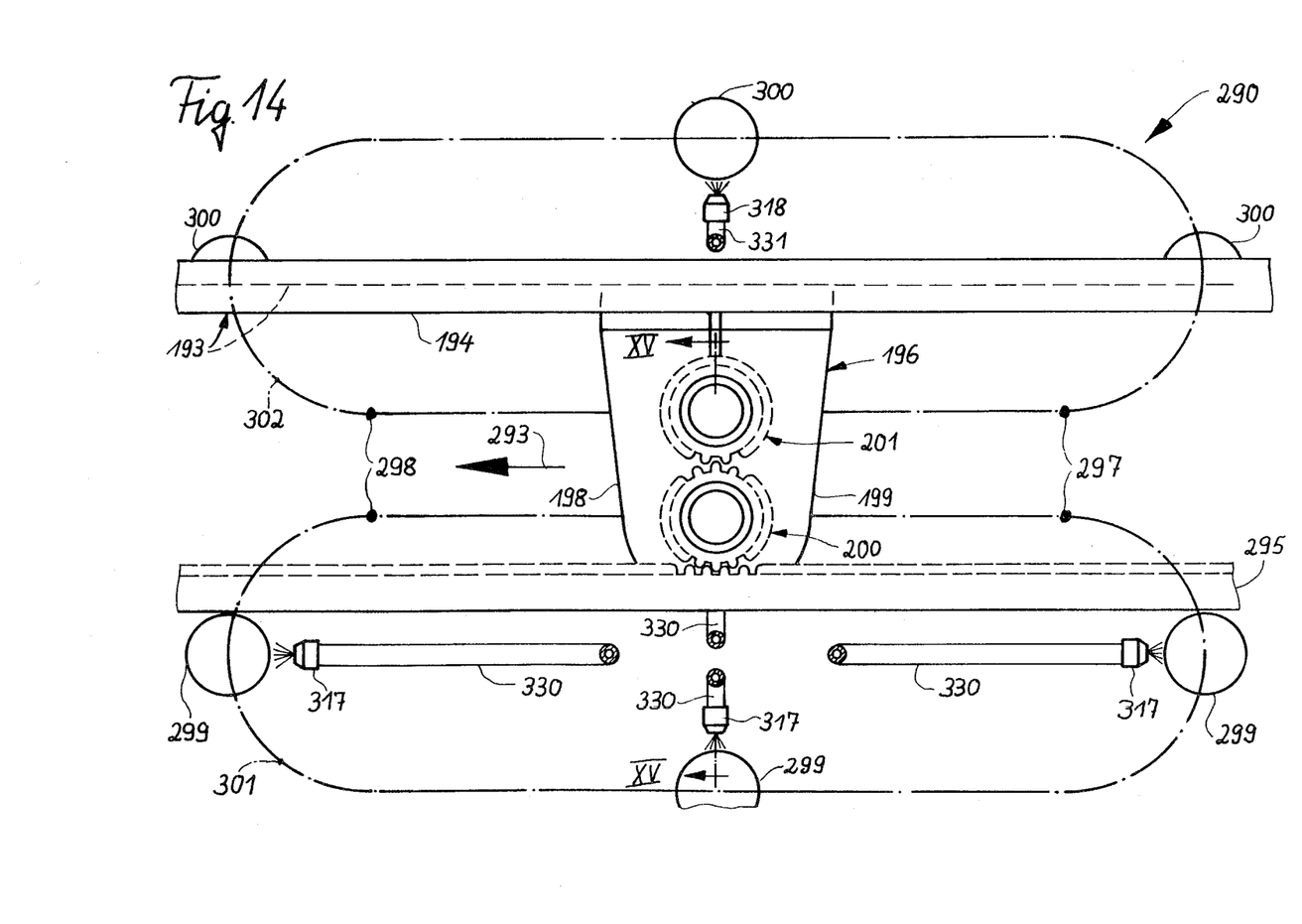
FIG. 14 is a schematic top view viewed along the line XIV—XIV of FIG. 15 of a preforming station.
Figure 15:
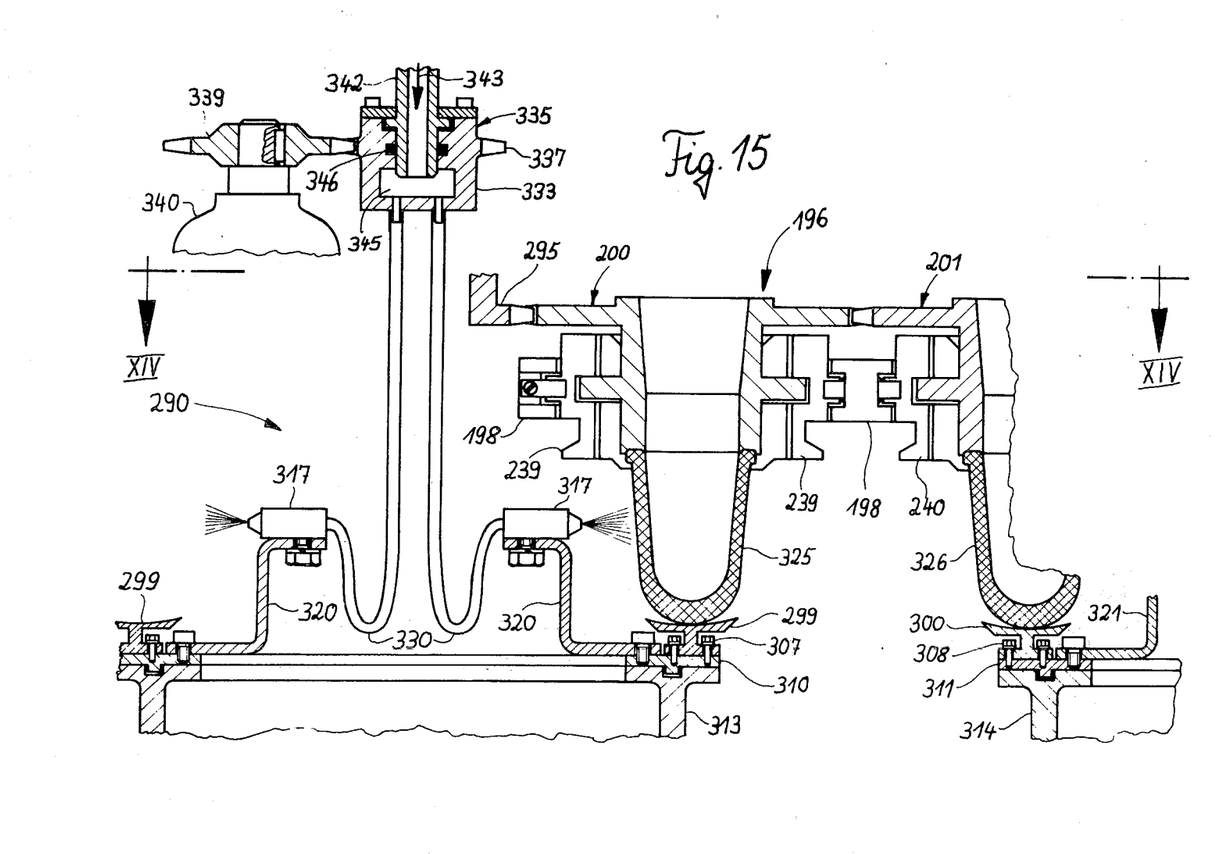
FIG. 15 is a cross section taken along the line XV—XV of FIG. 14.

FIGS. 14 and 15 schematically illustrate a pre-forming arrangement 290, for instance for intermediate forming between pressing and blowing which may be arranged along the transporting chain 193 upstream of the region of the turntable 190 shown for instance in FIG. 7 which carries the finish or blow molds. The neck ring pair 196 shown in FIG. 14 is moved by the transporting chain 193 in the direction of the arrow 293.

The guide rings 200 and 201 of the neck ring pair 126 are rotated about their axes by the engagement of the annular gear provided on the guide ring 200 with the teeth of a stationary rack 295.

The neck rings of the neck ring pair 196 which are provided respectively with the guide rings 200 and 201 are accompanied along portions of their path between the points 297 and 298 shown in FIG. 14 by support plates 299, 300 respectively arranged beneath and coaxially with the guide rings 200, 201, as best shown in FIG. 15. The centers of the support plates 290 and 300, which are adapted to support the lower ends of the parisons 325 and 326 respectively carried by the two neck ring means, are moved along endless paths 301, 302 in synchronism with the transport chain 193. This synchronous movement of the support plates 299 and 300 is accomplished by known means, not shown in the drawing.

The support plates 299 and 300 are respectively connected by screws 307 and 308 to flexible bands 310 and 311 respectively supported on beds 313 and 314. In the region of each support plate 299, 300 nozzles 317 and 318 (FIG. 14) are respectively connected by members 320 and 321 to the bands 310 and 311. The nozzles 317 and 318 are in the region between the points 297 and 298 directed onto the parisons 325 and 326 respectively carried by the neck rings so that the medium emanating from the nozzles impinges on an annular portion of the parisons 325 and 326 which are rotated by the guide rings 200, 201. The nozzles are connected by flexible tubes 330, 331 respectively with turning housings 333 of distributors 335 only one of which is shown in FIG. 15. The distributors are located respectively at the centers of the paths 301 and 302. Each housing 333 is provided at its upper surface with a gear 337 the teeth of which mesh with the teeth of a pinion 339 driven by a synchron motor 340. The synchron motor 340 is constructed to turn in synchronism and in phase with the drive of the transport chain 193 and that of the flexible bands 310 and 311. The mentioned electrical synchron drive is one of a plurality of known drive arrangements for the whole system.

The pressure medium, for instance cooling air or a burnable gas, is fed into each distributor 335 through a coaxial stationarily arranged conduit 342 in the direction of the arrow 343. The pressure medium is thus passed in the chamber 345 of the distributor 335. A sealing ring 346 arranged in a groove of the wall of the distributor engages surface of the conduit 342 to thus prevent any leakage of the pressure medium. If cooling air is supplied through the conduit 342 to the distributors 335, such cooling air will emanate from the nozzles 317, 318 to locally cool the parisons 325 and 326 to thereby prevent or reduce the flowability or elongation of the parison wall under the action of gravity. If, on the other hand, a burnable gas is fed to the nozzles 317, 318, such gas may be ignited as it leaves the nozzles to thereby locally heat the parisons 325 and 326 so as to increase the flowability of the glass of the parisons.

It is also possible to mount on the holders 320 and 321 instead of the nozzles 317 or 318 shown in FIGS. 14 and 15 means, for instance a rod movable in engagement with the parison for mechanically forming the parisons.

The bottoms of the parisons 325, 326 are supported in the arrangement illustrated in FIGS. 14 and 15 by the supporting plates 299 and 300 so that the parisons as they move through the preforming arrangement 290 may lengthen only to a limited degree, whereby also a certain forming of the bottoms of the parisons by the upper surfaces of the support plates 299, 300 will be carried out.

In addition it is also possible in a known manner to carry out in such a performing arrangement a further partial forming of the parisons by blowing compressed air thereinto by temporary engaging the guide rings 200, 201, in a manner similar to the manner as illustrated in FIG. 9, with blowing heads to thus admit air under pressure into the interior of the parison to preform the same outside of a blow mold.

In this way it is possible to subject the parisons to all in principle known preforming operations while rotating the parisons about their longitudinal axes.

It will be understood that each of the elements described above, or two or more together, may also find a useful application in other types of forming stations for machines for forming hollow articles of vitreous material differing from the types described above.

While the invention has been illustrated and described as embodied in a forming station of the aforementioned kind in which the parisons are rotated about their axes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a machine for forming hollow articles of vitreous material, a blow bold forming station comprising at least one forming means including neck ring means adapted to carry a parison, each neck ring means including a pair of neck ring halves and an integral guide ring mounted in and supported by said neck ring halves rotatable relative thereto and adapted to engage the parison for rotating the latter upon rotation of said guide ring, said forming means including further a split mold coaxial with said neck ring means and having two mold halves movable between an open and closed position and contacting in said closed position with portions thereof the parison, said mold halves having upper portions, which, in said closed position of said mold halves, enclose and interengage with adjacent portions of said neck ring halves to thereby maintain in said closed position of said mold halves the axial position of said neck ring halves relative to said mold halves; means for rotating said guide ring at said forming station relative to said neck ring halves and said mold halves while the axial position of the neck ring halves and mold halves is maintained, to thereby avoid forming of a parting line on those portions of the parison which are engaged by said neck ring and mold halves during forming of said parison; and means for preventing rotation of said neck ring halves with said guide ring.

2. A forming station as defined in claim 1, wherein said forming station is movable along a predetermined path, and wherein said rotating means comprise stationary means extending along said path and means on said guide ring engaging said stationary means for rotating said guide ring during movement of the forming station along said path.

3. A forming station as defined in claim 2, wherein said stationary means comprises a rack extending along said path and said means on said guide ring comprises a gear coaxially fixed to said guide ring and meshing with said rack.

4. A forming station as defined in claim 1, wherein said forming station is movable along a predetermined path having a circular portion, and wherein said rotating means comprises a gear ring concentrically arranged within said circular portion of said path, a gear coaxially fixed to said guide ring and meshing with said gear ring, and means for selectively rotating said gear ring about its axis.

5. A forming station as defined in claim 1, wherein said forming station is stationary, and wherein said rotating means comprises a gear coaxially fixed to said guide ring, a pinion meshing with said gear, and drive means for selectively rotating said pinion.

6. A forming station as defined in claim 1, wherein said forming station is stationary and wherein said rotating means comprises a crank drive connected to said guide ring for imparting to the latter an oscillatory rotary movement.

7. A forming station as defined in claim 1, and including blowing means having a blowing head coaxially arranged with said guide ring, means for rotating said blowing head about its axis, and means for selectively coupling said blowing head to said guide ring for rotating the latter of said forming station together with said blowing head.

8. A forming station as defined in claim 7, wherein said blowing means comprises a drive sleeve, means for rotating said drive sleeve about its axis, said blowing head being arranged coaxially with and axially movable with respect to said drive sleeve and connected to the latter for rotation therewith.

9. A forming station as defined in claim 8, wherein said forming station is movable along a predetermined path, and wherein said rotating means comprises rack means extending along at least part of said path and a gear co-axially fixed to said drive sleeve and meshing with said rack means.

10. A forming station as defined in claim 8, wherein said forming station is movable along a predetermined path having a circular portion, and wherein said rotating means comprises a gear ring coaxially arranged with said circular portion, a gear fixed to said drive sleeve and meshing with said gear ring, and means for selectively rotating said gear ring about its axis.

11. A forming station as defined in claim 8, wherein said forming station is stationary, and wherein said drive sleeve is formed with an annular groove of V-shaped configuration and said rotating means comprises a driven V-belt engaged in said groove.

12. A forming station as defined in claim 8, wherein said forming station is stationary and wherein said rotating means comprises a crank drive connected to said drive sleeve for imparting to the latter an oscillatory rotary motion.

13. A forming station as defined in claim 1, wherein said forming station comprises a plurality of forming means, each including a neck ring means having each a pair of neck ring halves movable between an open and a closed position, and a guide ring coaxially carried in said neck ring halves of each neck ring means rotatable relative thereto, said guide rings being constructed to be in drive engagement with each other at least when said neck ring halves are in said closed position, said rotating means cooperating with at least one of said guide rings for rotating the same about its axis.

14. A forming station as defined in claim 13, and including a blowing means coaxially arranged with each of said guide rings and connected thereto for rotation therewith, said rotating means cooperating with one of said blowing means for rotating the same about its axis.

15. A forming station as defined in claim 1, wherein said forming station comprises a plurality of forming means, each including neck ring means having a pair of neck ring halves and a guide ring coaxially carried in said neck ring halves rotatable relative thereto, and a plurality of blowing means, one for each forming means and respectively coaxially arranged therewith, each of said blowing means comprises a drive sleeve and a blowing head coaxially with and movable in axial direction with respect to said drive sleeve and connected to the latter for rotation therewith, the drive sleeves of said plurality of blowing means being constructed to be in drive engagement with each other, and said rotating means cooperating with at least one of said drive sleeves for rotating the same about its axis.

16. A forming station as defined in claim 1, wherein said guide ring has a surface engaging a parison carried by said neck ring means, said surface being provided with profiled surface portions to assure rotational movement of said parison together with said guide ring.

17. A forming station as defined in claim 16, wherein said surface of said guide ring is an annular bottom face thereof, and wherein said profiled surface portions are constituted by a plurality of circumferentially spaced part-spherical portions extending from said bottom face to either side thereof.

* * * * *